(12) United States Patent
Wagoner et al.

(10) Patent No.: US 8,791,671 B2
(45) Date of Patent: Jul. 29, 2014

(54) SYSTEM AND METHOD FOR OPTIMIZATION OF DUAL BRIDGE DOUBLY FED INDUCTION GENERATOR (DFIG)

(71) Applicant: General Electric Company, Schenectady, NY (US)

(72) Inventors: Robert Gregory Wagoner, Roanoke, VA (US); David Smith, Daleville, VA (US)

(73) Assignee: General Electric Company, Schenectady, NY (US)

( * ) Notice: Subject to any disclaimer, the term of this patent is extended or adjusted under 35 U.S.C. 154(b) by 53 days.

(21) Appl. No.: 13/707,965

(22) Filed: Dec. 7, 2012

(65) Prior Publication Data
US 2014/0159677 A1   Jun. 12, 2014

(51) Int. Cl.
*H02P 11/00*   (2006.01)

(52) U.S. Cl.
USPC .............................. 322/28; 322/27; 363/56.02

(58) Field of Classification Search
USPC .................. 322/27, 28, 37; 363/56.2, 132
See application file for complete search history.

(56) References Cited

U.S. PATENT DOCUMENTS

| | | | |
|---|---|---|---|
| 7,239,036 B2 * | 7/2007 | D'Atre et al. | 290/44 |
| 7,423,412 B2 * | 9/2008 | Weng et al. | 322/20 |
| 7,579,702 B2 * | 8/2009 | Park et al. | 290/44 |
| 7,884,492 B2 * | 2/2011 | Xiong et al. | 290/55 |
| 7,994,750 B2 * | 8/2011 | Wagoner et al. | 318/800 |
| 8,050,063 B2 * | 11/2011 | Wagoner et al. | 363/56.02 |
| 8,093,741 B2 * | 1/2012 | Ritter et al. | 290/44 |
| 8,264,209 B2 * | 9/2012 | Kretschmann | 322/25 |
| 8,664,788 B1 * | 3/2014 | Wagoner et al. | 290/44 |
| 8,669,669 B1 * | 3/2014 | Wagoner et al. | 290/44 |
| 8,674,665 B2 * | 3/2014 | Sheng et al. | 322/37 |

* cited by examiner

*Primary Examiner* — Nicholas Ponomarenko
(74) *Attorney, Agent, or Firm* — Dority & Manning, P.A.

(57) ABSTRACT

The present subject matter is directed to systems and methods for improving reliability of dual bridge doubly fed induction generators (DFIGs) by reducing the number of required components in the converters associated with such DFIGs. A converter is constructed using a pair of current conducting bridges wherein one of the current conducting bridges is controlled and the second is not controlled. The uncontrolled bridge may correspond to a pair of diodes while the controlled bridge may correspond to a pair of transistors, in particular, a pair of IGBT transistors.

20 Claims, 4 Drawing Sheets

SYSTEM AND METHOD FOR OPTIMIZATION OF DUAL BRIDGE DOUBLY FED INDUCTION GENERATOR (DFIG)

FIELD OF THE SUBJECT MATTER

The present subject matter relates generally to the field of doubly fed induction generators (DFIG) and, more particularly, methods and apparatus for optimizing power converters for such generators.

BACKGROUND OF THE SUBJECT MATTER

New three megawatt (MW) doubly fed induction generators (DFIG) under development by the owner of the present subject matter incorporate the first DFIG converters where it has become necessary to operate multiple power bridges in parallel. In order to design a power converter with low cost and high reliability, it has previously been necessary to connect insulated-gate bipolar transistor (IGBT) bridges in parallel, and balance the current sharing on parallel IGBT modules. Such a system is illustrated in FIGS. 1 and 2. In order to place the teachings of the current invention into context, a review of aspects of components for generating electricity using a wind turbine are now discussed.

Referring to FIG. 1, there is shown an exemplary embodiment of aspects of wind turbine system 100. In this embodiment, a rotor 106 includes a plurality of rotor blades 108 coupled to a rotating hub 110. The hub 110 is coupled to an optional gear box 118, which is, in turn, coupled to a generator 120. In accordance with present disclosure, generator 120 is a doubly fed induction generator (DFIG) 120.

DFIG 120 is typically coupled to stator bus 154 and a power conversion component 162 via a rotor bus 156. The stator bus 154 provides output of three-phase power from a stator (not separately illustrated) of DFIG 120 and the rotor bus 156 provides output of three-phase power from a rotor (not separately illustrated) of the DFIG 120. With particular reference to the power conversion component 162, DFIG 120 is coupled via the rotor bus 156 to a rotor side converter 166. The rotor side converter 166 is coupled to a line side converter 168, which in turn is coupled to line side bus 188. In exemplary configurations, the rotor side converter 166 and the line side converter 168 are configured for a normal operating mode in a three-phase, two level, Pulse Width Modulation (PWM) arrangement using Insulated Gate Bipolar Transistor (IGBT) switching devices as illustrated in FIG. 2. The rotor side converter 166 and the line side converter 168 are coupled via a DC link 136 across which is the DC link capacitor 138.

The power conversion component 162 also includes a controller 174 to control the operation of the rotor side converter 166 and the line side converter 168. It should be noted that the controller 174, in typical embodiments, is configured as an interface between the power conversion component 162 and a control system 176.

In typical configurations, various line contactors and circuit breakers including, for example, grid breaker 182 may be included to isolate the various components as necessary for normal operation of DFIG 120 during connection to and disconnection from power grid 184. A system circuit breaker 178 couples the system bus 160 to transformer 180, which is connected to power grid 184 via grid breaker 182.

In operation, power generated at DFIG 120 by the rotating rotor 106 is provided via a dual path to power grid 184. The dual paths are defined by the stator bus 154 and the rotor bus 156. On the rotor bus 156 side, sinusoidal three-phase alternating current (AC) power is converted to direct current (DC) power by the power conversion component 162. The converted power from the power conversion component 162 is combined with the power from the stator of DFIG 120 to provide three-phase power having a frequency that is maintained substantially constant, for example, at a sixty Hertz AC level. The power conversion component 162 compensates or adjusts the frequency of the three-phase power from the rotor of DFIG 120 for changes.

As is known in the art, various circuit breakers and switches within the wind turbine system 100, including grid breaker 182, system breaker 178, stator sync switch 158, converter breaker 186, and line contactor 172 are configured to connect or disconnect corresponding buses, for example, when current flow is excessive and can damage the components of the wind turbine system 100 or for other operational considerations. Additional protection components (not shown) may also be provided.

It should be noted that wind turbine system 100 generates power as is known in the art and may be modified to operate in connection with different power systems, etc. It should also be recognized that aspects of wind turbine system 100 as discussed herein are merely illustrative and not limiting thereof.

In various embodiments, the power conversion component 162 receives control signals from, for example, the control system 176 via the controller 174. The control signals are based, among other things, on sensed conditions or operating characteristics of the wind turbine system 100. Typically, the control signals provide for control of the operation of the power conversion component 162. For example, feedback in the form of sensed speed of the DFIG 120 may be used to control the conversion of the output power from the rotor bus 156 to maintain a proper and balanced three-phase power supply. Other feedback from other sensors also may be used by the control system 174 to control the power conversion component 162, including, for example, stator and rotor bus voltages and current feedbacks. Using the various forms of feedback information, and for example, switching control signals, stator synchronizing switch control signals and system circuit breaker control (trip) signals may be generated in any known manner.

With reference to FIG. 2, the power converter system utilizes a DFIG converter 200 with two parallel H-bridges 202, 204 on each phase of the rotor side as shown in FIG. 2, wherein the two parallel bridges 202, 204 are coupled together with output inductors 212, 214. As is known, rotor shunt devices 216, 218 are employed to monitor current flow $I_{rotor}$ through their respective inductors 212, 214 as a part of the control system (not separately illustrated). The cost and reliability of such a system are a concern due to the number of extra components.

DFIGs have been used in conjunction with wind turbines for reactive power control in response to fluctuations in wind speed. In addition, some wind turbine systems have been configured to use power converters to adjust their outputs to match the grid frequency. However, such reactive techniques do not provide a method for maintaining a selected output frequency during modifications to turbine speed, for example, to increase efficiency, such as during turbine turn-down or modifications of turbine speed, for example, in response to power demands.

It is known in the art to use a single DFIG system and to modulate the power output and frequency of such a power generation unit coupled to a power grid. Using such a DFIG system, the turbine speed can be modified without disturbing the generator output frequency. These DFIG systems couple a single DFIG with both a turbine and converter such that the converter compensates for variations in the DFIG output frequency caused by changing turbines speeds. In such systems, compensation is provided by varying the excitation of the generator rotor to control the stator output frequency to match the grid frequency.

While single DFIG systems are effective at controlling output frequency, such systems generally can only provide up to about 3 megawatts of power, which is insufficient for operation at a utility scale, for example, in the range of 100 to 500 megawatts. Single DFIG systems have limited power generation capacity due to manufacturing limitations with respect to the size and rating of machine components, particularly the DFIG shaft, rotor, and slip rings. Also, these single DFIG systems are difficult to implement due to the high rating of a full scale DFIG converter, which would necessarily be 10% to 20% of the generator rating. Finally, single DFIG systems do not provide for degraded mode operation, so the failure of one system component, for example, a converter, shuts down the entire system.

In view of these known issues, it would be advantageous, therefore, to provide a system and method for controlling power output and frequency for a variable speed generator at a utility scale while reducing component size, rating, and stress.

BRIEF DESCRIPTION OF THE SUBJECT MATTER

Aspects and advantages of the subject matter will be set forth in part in the following description, or may be obvious from the description, or may be learned through practice of the subject matter.

In accordance with the present subject matter, there is disclosed a system for improving reliability in a doubly fed induction generator (DFIG). In a particular embodiment, the system includes a doubly fed induction generator having a stator including stator windings and a rotor including rotor windings. Per aspects of the present subject matter, improved reliability is obtained by providing a rotor side converter coupled to the rotor windings, wherein the rotor side converter includes a plurality of current conducting bridges configured to couple the rotor windings of the doubly fed induction generator to a power grid. In this embodiment, the plurality of current conducting bridges includes at least one controlled current conducting bridge and at least one uncontrolled current conducting bridge. In certain embodiments, the controlled current conducting bridge includes a pair of transistors and the uncontrolled current conducting bridge includes a pair of diodes. In other embodiments, the controlled current conducting bridge may include a pair of insulated gate bipolar transistors.

System embodiments constructed in accordance with the present subject matter may also include at least one current measurement device coupled to the plurality of current conducting bridges. In certain embodiments, the current measurement device may be coupled to each of the plurality of current conducting bridges. In still further embodiments, at least one output inductor is coupled to the plurality of current conducting bridges. For example, an output inductor may be coupled to each of the plurality of current conducting bridges.

The present subject matter also relates to a converters for use with a doubly fed induction generator (DFIG) for coupling rotor windings of the DFIG to a power grid. It should be appreciated that while the present exemplary embodiments discussed herein after are directed primarily to rotor side converters, the present subject matter is equally applicable to line side converters. According to such embodiments, a plurality of current conducting bridges are configured to couple the rotor of a DFIG to a power grid. In such embodiments, the plurality of current conducting bridges includes at least one controlled current conducting bridge and at least one uncontrolled current conducting bridge. In selected embodiments, the controlled current conducting bridge includes a pair of transistors, in particular, a pair of IGBT transistors, and the uncontrolled current conducting bridge includes a pair of diodes.

In particular embodiments, the converter may include at least one current measurement device coupled to each of the plurality of current conducting bridges and there may alternately be provided at least one output inductor coupled to each of the plurality of current conducting bridges. In some embodiments, the at least one output inductor is coupled to each of the plurality of current conducting bridges.

The present subject matter also relates to methods for operating a doubly fed induction generator (DFIG). In accordance with such methods, current is applied to each of a plurality of rotor windings of a DFIG through a plurality of current conducting bridges, which include at least one controlled current conducting bridge and at least one uncontrolled current conducting bridge. In some embodiments of the method, the controlled current conducting bridge includes a pair of transistors, in particular, a pair of insulated gate bipolar transistors (IGBT), and the uncontrolled current conducting bridge includes a pair of diodes.

The method, in accordance with the present disclosure, also provides for applying current to each of the plurality of rotor windings through at least one current measurement device coupled to each of the plurality of current conducting bridges. Such method may also provide for coupling the at least one current measurement device to each of the plurality of current conducting bridges. In accordance with further aspects, the method may also provide for applying current to each of the plurality of rotor windings through at least one output inductor coupled to each of the plurality of current conducting bridges. In selected embodiments, the at least one output inductor may be coupled to each of the plurality of current conducting bridges.

The present subject matter describes unique methods and systems for optimizing a power converter with Parallel Power Bridges in a DFIG Wind Turbine System, resulting in a significant cost reduction as well as a significant improvement in reliability.

BRIEF DESCRIPTION OF THE DRAWINGS

A full and enabling disclosure of the present subject matter, including the best mode thereof, directed to one of ordinary skill in the art is set forth in the specification, which makes reference to the appended figures, in which.

DETAILED DESCRIPTION OF THE SUBJECT MATTER

Figure 1:
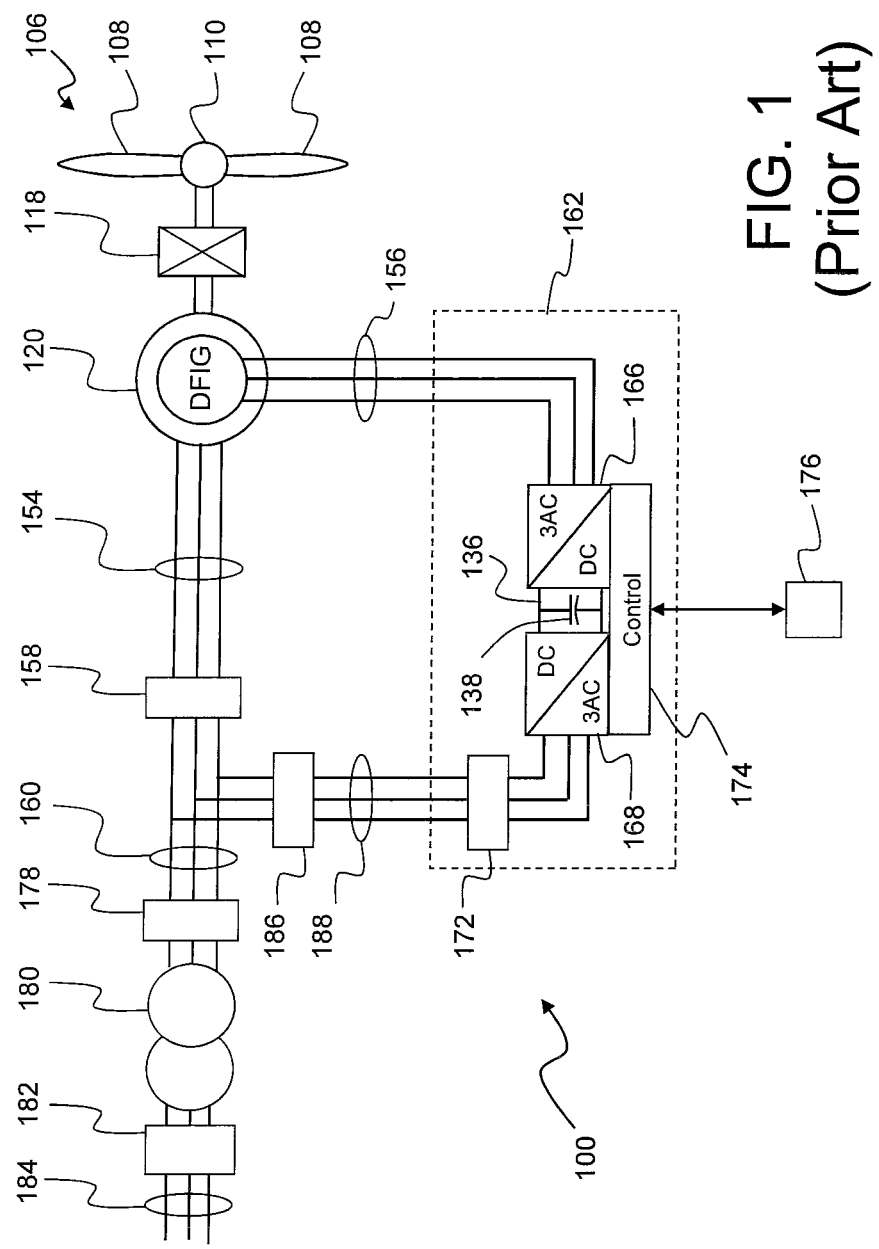
FIG. 1 depicts aspects of an exemplary control system for a wind turbine.

As discussed in the Summary of the Subject Matter section, the present subject matter is particularly concerned with methods and apparatus for optimizing power converters for use with doubly fed induction generators.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
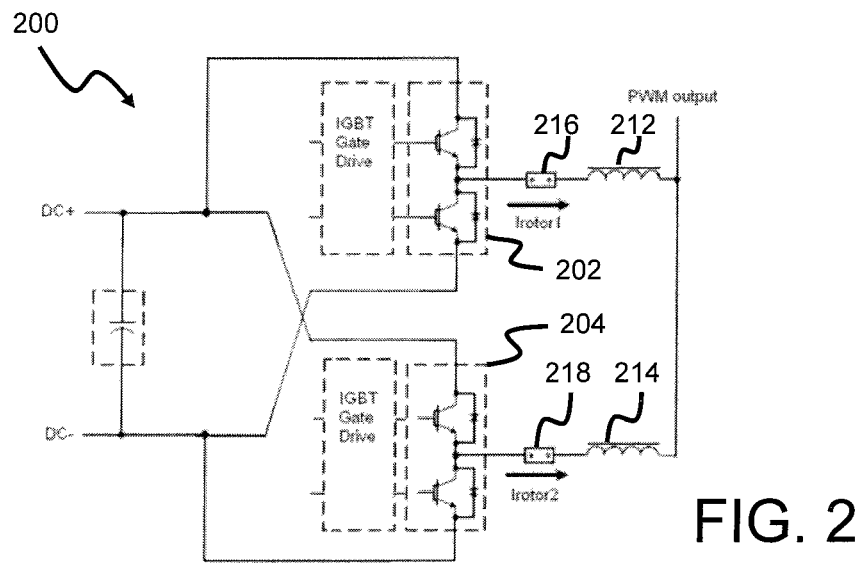
FIG. 2 depicts aspects of a previously employed rotor DC-AC converter incorporating a pair of parallel IGBT bridges.
Figure 3:
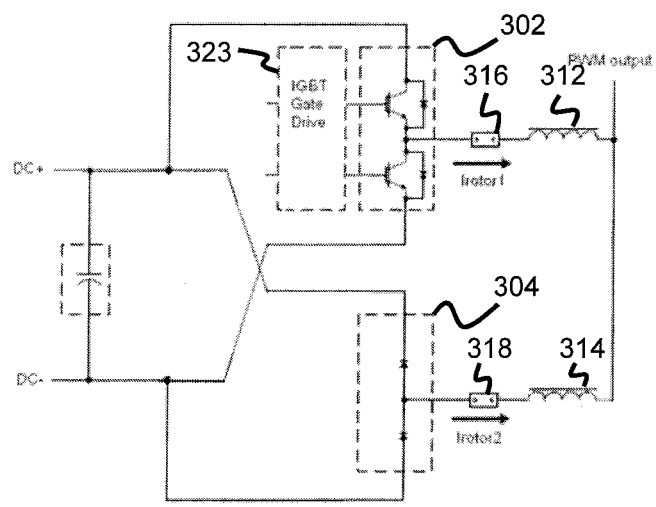
FIG. 3 illustrates a first embodiment of the present subject matter incorporating a diode bridge configuration.

With initial reference to FIG. 3, there is illustrated an exemplary embodiment of a DFIG rotor side converter 300 constructed in accordance with the present subject matter. It will be noticed that, in accordance with the present subject matter, one of the IGBT bridges, as well as its associated driver circuit, of the pair of bridges 202, 204 illustrated in FIG. 2 has been replaced entirely by a rotor bridge 304 corresponding to a pair of diodes while leaving rotor bridge 302 and its associated Gate Driver 323 constructed as previously described with respect to the system of FIG. 2. In this embodiment, output inductors 312, 314 and rotor shunt devices 316, 318 remain. In accordance with the present subject matter, such circuit simplification is possible because rotor bridge 304 is operated in a regeneration mode at super-synchronous generator speeds, and it is at these super-synchronous generator speeds where the system puts out the highest power. In regeneration mode, the diodes carry the majority of the current, and the IGBTs do very little work. Hence, at the system operating points where the highest current is required, it is the diodes of rotor bridge 304 that do most of the work.

As the generator speed drops to synchronous and sub-synchronous speeds, the Wind Turbine system is allowed to provide reduced output power. Also, as the generator speed drops to synchronous and sub-synchronous speeds, the power factor changes, so that the IGBTs of the unchanged rotor bridge 302 need to do more of the work than the diodes. Since the output power is reduced, a single IGBT bridge can carry the required current, if properly sized and coordinated with the generator and system requirements.

Figure 4:
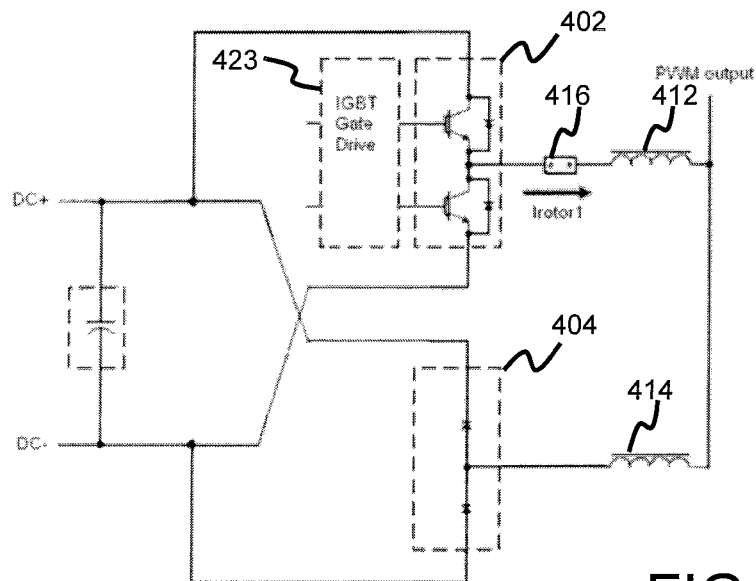
FIG. 4 illustrates a alternative embodiment of the system of FIG. 3 in accordance with the present subject matter.

FIG. 4 shows an alternate embodiment of a DFIG rotor side converter 400. In this embodiment, the Rotor Shunt 318 from the embodiment of FIG. 3 has been removed. As there is no control of the current flowing through inductor 414, it is not necessary to sense such current. In this manner, elimination of Rotor Shunt 318 further reduces system cost. As with previous embodiments, Rotor Shunt 416 and output inductor 412 remain.

Figure 5:
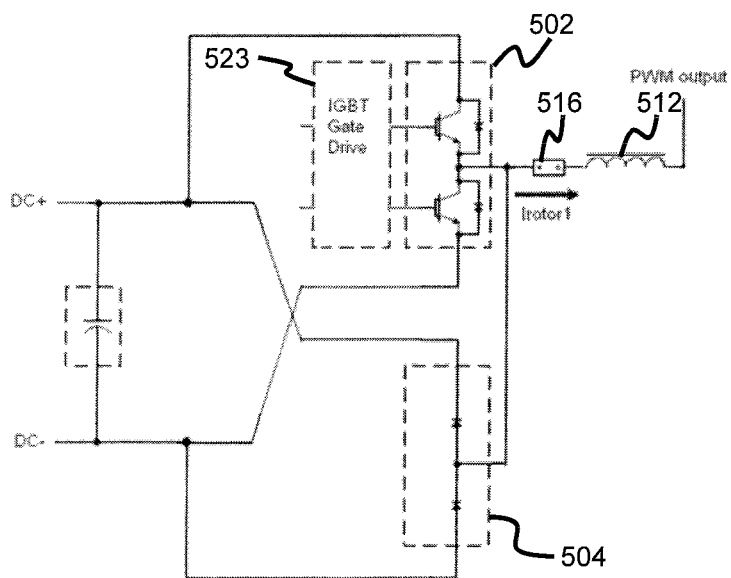
FIG. 5 illustrates a further alternative embodiment of the system of FIG. 3 in accordance with the present subject matter.

FIG. 5 shows a further alternate embodiment of a DFIG rotor side converter 500 constructed in accordance with the present subject matter. In this embodiment, IBGT bridge 502 and its associated IGBT Gate Driver 523 are retained along with output inductor 512 and rotor shunt 516, but output inductor 414 (FIG. 4) previously provided is also removed and the output of bridge 504 is coupled through Rotor Shunt 516 to inductor 512. In this configuration, the minimum number of components is employed to achieve the lowest system cost and maximum reliability.

As will be evident from the forgoing description, the present subject matter provides a number of advantages over previous controller configurations. One advantage resides in the significant cost reduction achieved by eliminating gate drives and IGBTs previously required by a second bridge. Similarly, the present subject matter provides a more reliable converter system because it eliminates those same components. Finally, the control software used to operate the IBGT gate drivers 323, 423, 523 can be simplified by eliminating the current balancing controls, and, as current balancing is no longer required, components involved in current measurement, for example, rotor shunt 318 (FIG. 3), may also be eliminated thereby producing additional savings.

Figure 6:
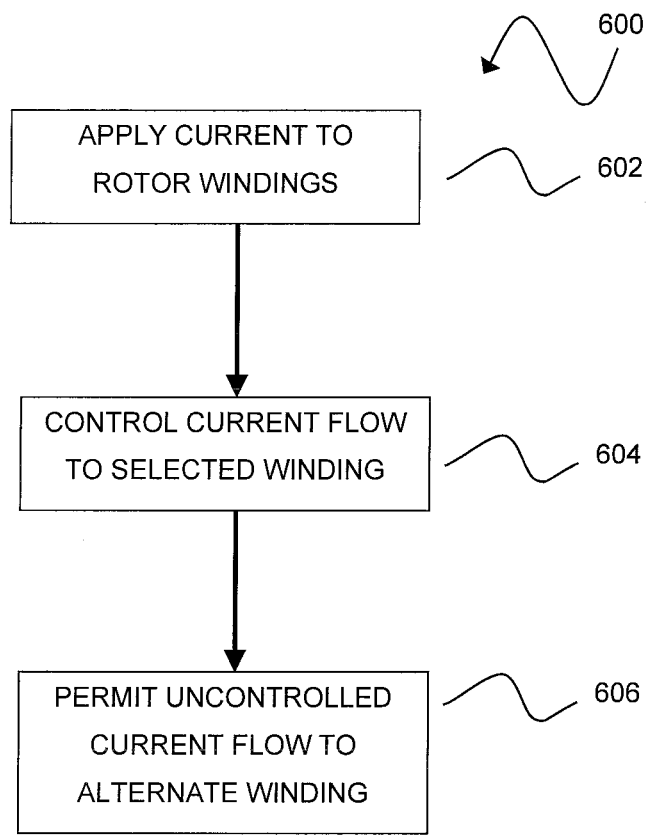
FIG. 6 illustrates a flow chart representing an exemplary method for energizing DFIG rotor windings in accordance with present subject matter.

With reference to present FIG. 6, there is illustrated a flow chart 600 representing an exemplary method for energizing DFIG rotor windings in accordance with present subject matter. As may be seen, at step 602 current may be applied to selected windings of the DFIG rotor from a rotor side converter. In accordance with the present subject matter, at step 604, a selected one of the current sources to the rotor windings is controlled while at step 606, current applied to an alternate, or second, winding is uncontrolled. As has been previously described, controlled current may be provided by way of a transistor current bridge, in particular, an IGBT transistor bridge. Similarly, as previously noted, uncontrolled current may be applied by way of a diode bridge.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A doubly fed induction generator system, comprising:
   a doubly fed induction generator having a stator including stator windings and a rotor including rotor windings; and,
   a converter coupled to said rotor windings, the converter comprising a plurality of current conducting bridges configured to couple said rotor windings of said doubly fed induction generator to a power grid,
   wherein said plurality of current conducting bridges comprise at least one controlled current conducting bridge and at least one uncontrolled current conducting bridge.

2. The system as in claim 1, wherein said at least one controlled current conducting bridge comprises a pair of transistors and said at least one uncontrolled current conducting bridge comprises a pair of diodes.

3. The system as in claim 1, wherein said at least one controlled current conducting bridge comprises a pair of insulated gate bipolar transistors.

4. The system as in claim 1, further comprising:
   at least one current measurement device coupled to each of said plurality of current conducting bridges.

5. The system as in claim 4, wherein said at least one current measurement device is coupled to each of said plurality of current conducting bridges.

6. The system as in claim 1, further comprising:
at least one output inductor coupled to each of said plurality of current conducting bridges.

7. The system as in claim 6, wherein said at least one output inductor is coupled to each of said plurality of current conducting bridges.

8. A converter for use with a doubly fed induction generator (DFIG) for coupling rotor windings of the DFIG to a power grid, comprising:
a plurality of current conducting bridges configured to couple said rotor to a power grid, wherein said plurality of current conducting bridges comprise at least one controlled current conducting bridge and at least one uncontrolled current conducting bridge.

9. The converter as in claim 8, wherein said at least one controlled current conducting bridge comprises a pair of transistors and said at least one uncontrolled current conducting bridge comprises a pair of diodes.

10. The converter as in claim 8, wherein said at least one controlled current conducting bridge comprises a pair of insulated gate bipolar transistors.

11. The converter as in claim 8, further comprising:
at least one current measurement device coupled to each of said plurality of current conducting bridges.

12. The converter as in claim 11, wherein said at least one current measurement device is coupled to each of said plurality of current conducting bridges.

13. The converter as in claim 8, further comprising:
at least one output inductor coupled to each of said plurality of current conducting bridges.

14. The converter as in claim 13, wherein said at least one output inductor is coupled to each of said plurality of current conducting bridges.

15. A method for operating a doubly fed induction generator (DFIG), said DFIG including a plurality of rotor windings, comprising:
applying current to each of said plurality of rotor windings through a plurality of current conducting bridges, wherein said plurality of current conducting bridges comprise at least one controlled current conducting bridge and at least one uncontrolled current conducting bridge.

16. A method as in claim 15, wherein said at least one controlled current conducting bridge comprises a pair of transistors and said at least one uncontrolled current conducting bridge comprises a pair of diodes.

17. A method as in claim 15, wherein said at least one controlled current conducting bridge comprises a pair of insulated gate bipolar transistors.

18. A method as in claim 15, further comprising:
applying current to each of said plurality of rotor windings through at least one current measurement device coupled to each of said plurality of current conducting bridges.

19. A method as in claim 18, wherein said at least one current measurement device is coupled to each of said plurality of current conducting bridges.

20. A method as in claim 15, further comprising:
applying current to each of said plurality of rotor windings through at least one output inductor coupled to each of said plurality of current conducting bridges; and
wherein said at least one output inductor is coupled to each of said plurality of current conducting bridges.

* * * * *